United States Patent

Shinohara et al.

[15] 3,662,345

[45] May 9, 1972

[54] MATRIX SIGNAL SWITCHING DEVICE

[72] Inventors: Takeo Shinohara; Yoshikazu Miyamoto; Atsushi Minato; Chikahiko Maeda, all of Tokyo, Japan

[73] Assignee: Nippon Electric Company, Limited, Tokyo, Japan

[22] Filed: Nov. 20, 1970

[21] Appl. No.: 91,266

[30] Foreign Application Priority Data

Nov. 24, 1969 Japan....................................44/94069

[52] U.S. Cl.......................................340/166 R, 317/101 CE
[51] Int. Cl...........................................................H04q 9/00
[58] Field of Search..............................340/147, 147 T, 166; 179/18 GE, 18 GF; 317/101 CE

[56] References Cited

UNITED STATES PATENTS 2,901,547 8/1959 Miloche.............................179/18 GE
3,028,581 4/1962 Thorpe...........................340/147 T X
3,399,380 8/1968 Spandorfer............................340/147

*Primary Examiner*—Donald J. Yusko
*Attorney*—Marn & Jangarathis

[57] ABSTRACT

A signal transfer device including a first matrix having a plurality of first input signal lines spaced in mutually parallel relation in one plane and a plurality of first signal output lines spaced in mutually parallel relation to perpendicularly intersect the first input lines in the one plane, a second matrix having a plurality of second input lines spaced in mutually parallel relation in said one plane and a plurality of second signal output lines spaced in mutually parallel relation to perpendicularly intersect the second input signal lines in the one plane, the first and second matrices so mutually positioned that the first output signal lines and the second input signal lines are oppositely disposed, and a plurality of mutually parallel link lines, each connecting the opposing ends of one of the first signal output lines and one of the second signal input lines in the same plane, thereby obviating crossovers of the link lines.

6 Claims, 9 Drawing Figures

INVENTORS
Takeo Shinohara, Yoshikazu Miyamoto,
Atsushi Minato, Chihohiko Maeda
BY
Mann & Jangarathis
ATTORNEYS INVENTORS
Takeo Shinohara, Yoshikazu Miyamoto,
Atsushi Minato, Chikahiko Maeda
BY
Marn & Jangarathis
ATTORNEYS INVENTORS
Takeo Shinohara, Yoshikazu Miyamoto,
Atsushi Minato, Chikahiko Maeda
BY
Marn & Jangarathis
ATTORNEYS INVENTORS
Takeo Shinohara, Yoshikazu Miyamoto,
Atsushi Minato, Chikahiko Maeda
BY
Marn & Jangarathis
ATTORNEYS INVENTORS
Takeo Shinohara, Yoshikazu Miyamoto,
Atsushi Minato, Chikahiko Maeda
BY
Marn & Jangarathis
ATTORNEYS

MATRIX SIGNAL SWITCHING DEVICE

DETAILED DESCRIPTION OF THE INVENTION

This invention relates to a signal transferring device employing a plurality of switching elements whereby a plurality of input signal lines and output signal lines are transferred in their connections. More particularly, the invention relates to a signal transfer device wherein a desired pair of the input signal line and the output signal line is selected to be applied with a control signal, whereby a switching element provided for bridging these lines at the intersecting position of these lines is selectively opened or closed so that any one of the plurality of input signal lines can be selectively connected to any one of the plurality of output signal lines. The signal transfer device of the above-described operation can be widely employed, for instance, in an electronic computer, an information analyzer-synthesizer, an information processor, and the like.

In the heretofore employed signal transfer device, for the purpose of minimizing the number of the switching elements, the input signal lines and the output signal lines are arranged perpendicularly so that they are formed into a signal transfer matrix including switching elements bridging both of the signal lines at their intersecting points, and a plurality of such matrices are interconnected between each other through linking connectors. More specifically, there are provided a primary stage to which a plurality of input terminals are connected, a secondary stage, and a last stage to which a plurality of output terminals are connected, each of the stages including a plurality of the above-mentioned matrices, and these stages are interconnected through the linking connectors. Furthermore, the matrices are so constructed that a plurality of, for instance, magnetically self-holding switching elements (such as those having trade-name "Ferreed Switch") are fixedly arranged along the X-Y coordinates, these switching elements being mutually connected through lead-wires, and required driving windings for open-or-closing operation of the switching elements being provided for all of the switching elements.

In these signal transfer matrices, since the connections are not generally crossed over one on the other, the assembling work has been comparatively simple and mechanized assembling of such matrices has been expected.

However, the interconnections between the matrices by means of link-connectors inevitably include cross-overs, in each of which positions one connector is geometrically superposed over the other, whereby the connecting work has been complicated and the workability has been worsened.

Furthermore, in the conventional signal transfer devices, optimum values of the number of X-Y coordinates in the signal transfer matrices are different by the objects of the application and the sizes thereof, and for this reason, there is a necessity of preparing a large number of signal transfer matrices and combining these matrices into a signal transfer device for the fulfillment of the above-described demands. This has required a large number of parts to be prepared and stocked, rendering the conventional signal transferring device uneconomical and inefficient in the production.

Although the conventional construction of the signal transfer device is advantageous in the point that the required number of switching elements is minimized, various drawbacks such as the difficulties in assembling and link-connections between the matrices because of the existence of the cross-over points and the uneconomical features in the production because of the necessity of preparing various kinds of matrices have been found.

Therefore, the primary object of the prevent invention is to provide a signal transfer device wherein no geometrical cross-over point is included in the link-connections between the matrices, the assembling work of the device is simple and is easily mechanized, and the number of the switching elements required is also small.

Another object of the present invention is to provide a signal transfer device which is so constructed that various sizes and kinds of he signal transfer devices can be provided by combining a plurality of units of similar construction including the switching elements.

According to the present invention, the above-described objects can be achieved by a signal transfer device wherein are included mutually parallel signal link lines of a number equal to $l$, mutually parallel input signal lines of a number equal to $m$ and arranged to intersect with the above-mentioned signal link lines at one-half portion of the device, and mutually parallel output signal lines of a number equal to $n$ arranged to intersect with the signal link lines at the other half portion of the device. The $m$ input signal lines are divided into a plurality of groups each group including $r$ input signal lines, the $l$ signal link lines are divided at their signal inputs into groups each including $s$ signal link lines, and, in each group of the input signal lines, each component input signal line has intersecting points with corresponding link lines included in different groups of the signal link lines, and a plurality of switching elements are provided at the above-described intersecting points so that both of the input signal lines and the signal link lines can be bridge-connected through these switching elements.

Likewise, the signal link lines of a number equal to $l$ are divided into groups each group including $t$ signal link lines at their signal outputs, and $n$ output signal lines are divided into groups each including $u$ output signal lines. In each group of the output signal lines, each component output signal line includes a plurality of points intersecting with the corresponding link lines included in the different groups of the signal link lines, each group including $t$ signal link lines, and a plurality of switching elements are provided at the intersecting points so that both of the output signal lines and the signal link lines can be bridge-connected through these switching elements. In the above description, the characters $l$, $m$, $n$, $r$, $s$, $t$, $u$, $l/s$, $l/t$, $m/r$, and $n/u$ are positive integers larger than 1, at least one of $m$ or $n$ is a positive integer larger than 2 and between these integers there is a relation $r \times s = t \times u = l$.

In the signal transfer device according to the present invention, there is also provided a control portion of the device including control elements for the respective switching elements as described above. By controlling the control elements selectively, the switching elements corresponding to the controlled elements can be operated.

Furthermore, the supply system of the controlling signals to the control elements for the switching elements is constructed as in the case of the above-described signal link lines, input signal lines, and the output signal lines. More specifically, the control portion comprises mutually parallel $l$ control link lines, mutually parallel $m$ input control lines arranged to intersect with these control link lines at one half portion thereof, and mutually parallel output control lines arranged to intersect with these control link lines at the other half portion of the control link lines. The $m$ input control lines are divided into a plurality of groups each including $r$ input control lines, the $l$ control link lines are divided, at their input control line side, into a plurality of groups each including $s$ control link lines, and, in each group of the input control lines, each component input control line is provided with a plurality of intersecting points intersecting with the corresponding control link lines included in different groups of the control link lines, and a plurality of control elements are provided at the above-mentioned intersecting points so that each of the control elements is connected to both of the input control line and the control link line intersecting at the point.

Likewise, the control link lines of a number equal to $l$ are divided into a plurality of groups each including $t$ control link lines at their output control line side, and the $n$ output control lines are divided into a plurality of groups each including $u$ output control lines. In each group of the output control lines, each component output control line includes a plurality of intersecting points intersecting with the corresponding control link lines included in the different groups of the control link lines, each group including $t$ control link lines as described above, and a plurality of control elements are provided at the above-mentioned intersecting points so that each of the control elements is connected with the input control line and the control link line intersecting at that point.

Furthermore, the *r* input control lines included in each group of the input control lines and each including a separate switch are connected together to a terminal of one of *m*/*r* common switches and the other terminals of the *m*/*r* common switches are in turn connected to one terminal of a control signal source.

As for the input control lines, the u output control lines included in each group of the output control lines and each including a separate switch are connected together to a terminal of one of *n*/*u* switches, and the other terminals of the *n*/*u* switches are in turn connected to the other terminal of the control signal source. Furthermore, between the input control side and the output control line side of the *l* control link lines, there are provided with the same number of switches inserted one for each control link line.

With the above-described construction of the control portion of the signal transfer device according to the present invention, when the above-described plurality of switches are selectively operated, a current path is formed through the input control line, control link line, and the output control line, and a control signal current is passed through the circuit. As a result, the control elements located at the intersecting points between the input control line and the control link line and also between the control link line and the output control line are operated. The operation of the control elements closes the corresponding switching elements, and through the switching elements thus closed, one of the input signal line is connected through a signal link line to an output signal line.

Alternatively, the *r* input control lines constituting one group of the input control lines may be combined into one control line, and similarly, the *u* output control lines constituting each group of the input control lines may be combined into one output control line. Thus, a control element is provided at each of the intersecting points between the unified input control line and the control link lines and also between the control link lines and the unified output control line for controlling the switching elements.

The invention will be more clearly understood from the following description when read in conjunction with the accompanying drawing.

BRIEF DESCRIPTION OF THE DRAWING

FIG. 1A indicates a disposition of an input signal line and an output signal line and also a switching element employed in the conventional signal transfer device and also in the signal transfer device according to the present invention.

Figure 1A:
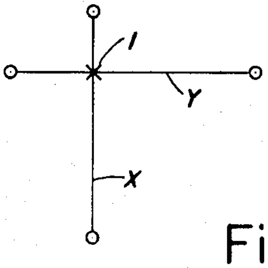
FIGS. 1A and B are schematic line diagrams showing the relation between input signal lines, output signal lines, and switching elements, and also between the switching elements, input control lines, and output control lines.
Figure 1B:
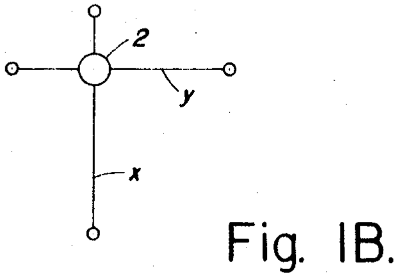
FIG. 1B illustrates the control portion for the switching element shown in FIG. 1A and also the arrangement of the input control line and the output control line. In the signal line portion of the device shown in FIG. 1A, an input line X and an output line Y are arranged perpendicular relative to each other, and at the intersecting point, a switching element 1 of, for instance, a mechanical switch of a magnetically holding reed type which can bridge-connect both of the input and the output signal lines X and Y is connected.

Although the control line portion shown in FIG. 1B does not show in detail, there is provided a magnetic core of easily reversible its magnetizing direction and having a strong residual magnetization. On the magnetic core, two windings are wound, and the magnetic core is coupled, for instance, with the above-described reed-switch of a mechanical type switching element 1, so that a control element 2 for the switching element 1 is thereby obtained. One of the above-described two windings of the control element 2 is connected to an input control line *x* corresponding to the input signal line X, and the other winding is connected to the output control line *y* corresponding to the output signal line Y shown in FIG. 1A.

Now, it is assumed that the switching element 1 is in the open condition and a control signal is applied to an input control line *x* and an output control line *y* simultaneously. In that case, the above-described magnetic core is magnetized and the switching element 1 coupled to the control element 2 is closed.

Furthermore, because of the strong residual magnetism in the magnetic core, the closed condition of the switching element 1 is self-held even after the control signal is removed from the circuit, thus maintaining the input signal line X connected to the output signal line Y. When a control signal is applied to either one of the input control line *x* or the output control line *y*, the magnetizing direction of the magnetic core in the control element 2 is reversed, and the switching element 1 is opened. The opened state of the switching element 1 is thereafter self-held until another control signal is applied simultaneously to the input control line *x* and the output control line *y* as described above. Opening of the switching element 1 disconnects the output signal line from the input signal line.

Figure 2A:
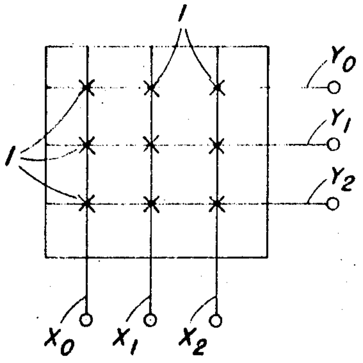
FIGS. 2A and B are schematic line diagrams showing a signal line portion and its control line portion of a signal switching matrix.

A conventional signal transfer matrix has been composed of a plurality of switching elements as shown in FIG. 1A arranged in a matrix form having 3 × 3 switching elements as shown in FIGS. 2A and B. FIG. 2A shows the signal line portion of the signal transfer device, wherein input signal lines $X_0$, $X_1$ and $X_2$ disposed vertically in the matrix are constituted by three input signal lines shown in FIG. 1A as series or parallel connected with each other. On the same matrix, there are also provided output signal lines $Y_0$, $Y_1$ and $Y_2$ disposed perpendicular to the above-mentioned input signal lines $X_0$, $X_1$ and $X_2$, and these output signal lines are made of series of parallel connected three output signal lines each of which is similar to that shown in FIG. 1A.

Figure 2B:
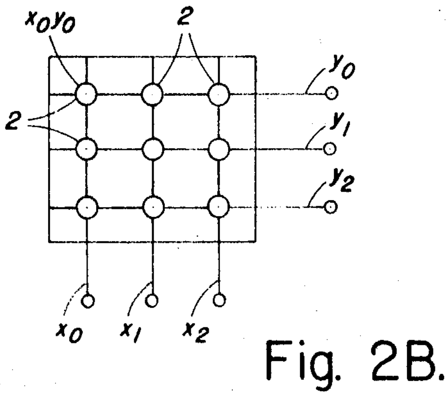

On the other hand, FIG. 2B illustrates a control line portion of the signal transfer device, which is to be cooperated with the above-mentioned signal line portion consisting of the signal transfer matrix. In the control line portion shown in FIG. 2B, input control lines $x_0$, $x_1$ and $x_2$ are connected in series or in parallel to control elements 2 located at positions corresponding to those of the switching elements 1 which are located on the signal transfer matrix along the input signal lines $X_0$, $X_1$ and $X_2$, and output control lines $y_0$, $y_1$ and $y_2$ are connected in series or in parallel to control elements 2 located at positions corresponding to those of the switching elements 1 which are located on the signal transfer matrix along the output signal lines $Y_0$, $Y_1$ and $Y_2$. With the above-described arrangements, the input control lines $x_0$, $x_1$ and $x_2$ are electrically connected in the control signal matrix to the output control lines $y_0$, $y_1$ and $y_2$, whereby a control path starting from any one of the input control lines to any one of the output control lines may be formed through any one of the connected points in the matrix.

Now supposing that a control signal is applied to one control path starting from the input control line $x_0$ to the output control line $y_0$, then the control signal is simultaneously given to two windings on a control element 2 located at the intersecting point ($x_0\,y_0$) of the two control lines, and the switching element 1 located at a position ($X_0\,Y_0$) corresponding to the intersecting point ($x_0\,y_0$) in the control line matrix is closed. Furthermore, all of the beforehand closed, switching elements 1 other than that located at the intersecting point ($X_0\,Y_0$) on the input signal line $X_0$ and the output signal line $Y_0$, which are corresponding to those points other than the intersecting point ($x_0\,y_0$) on the control line matrix are now opened, and those points not closed beforehand are remained in the opened state. This means that only the input signal line $X_0$ and the output signal line $Y_0$ are connected together.

Figure 3A:
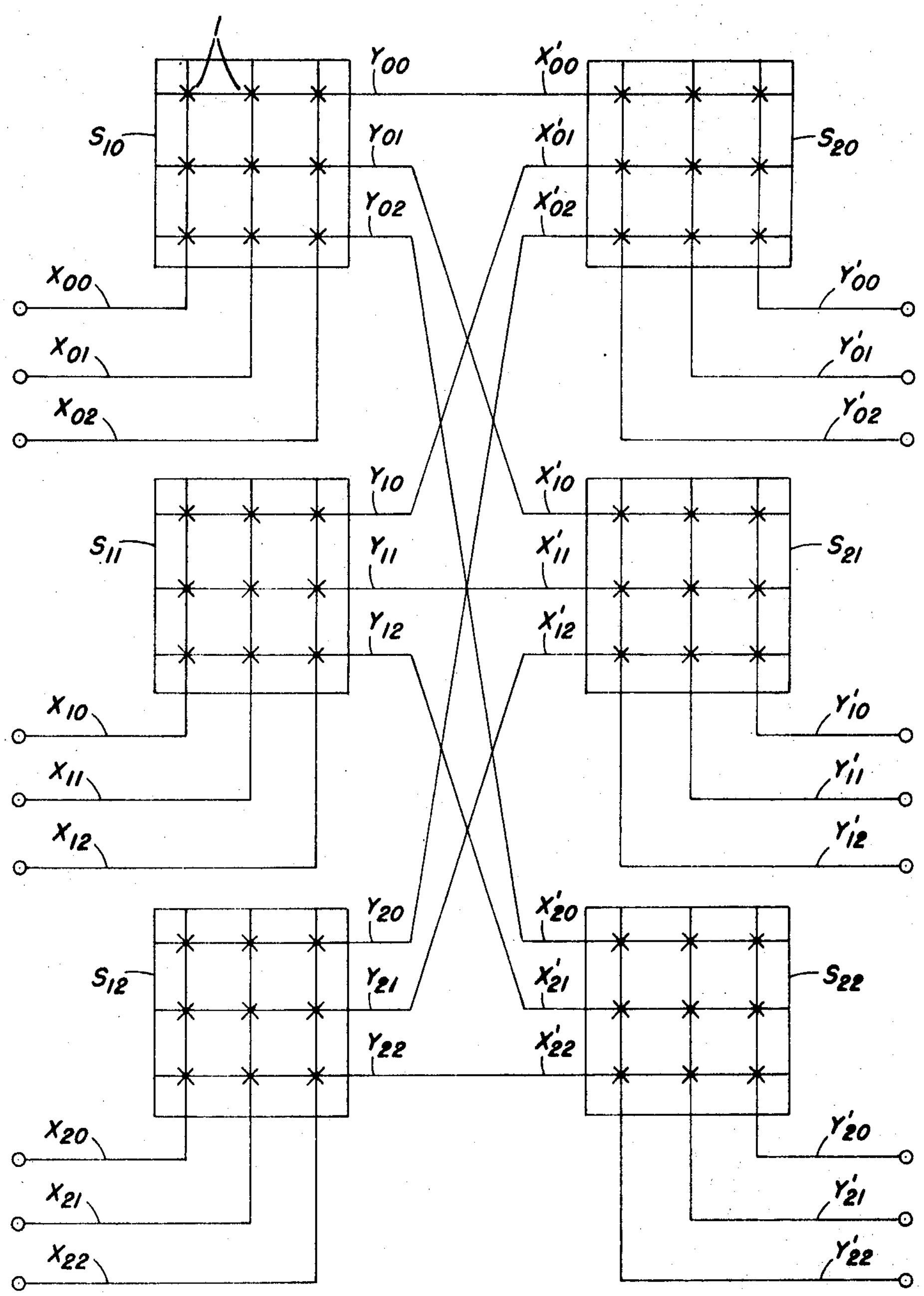
FIGS. 3A and B are schematic line diagrams showing construction of the signal line portions and the control line portions in a conventional signal transfer device.

Another conventional signal transfer device wherein two stages of matrices are employed in both of the signal line portion and the control line portion is illustrated in FIGS. 3A and B.

The signal line portion of the device is shown in FIG. 3A and it is apparent from the drawing that a signal path starting from any selected one of the input signal lines $X_{00}$, $X_{01}$, $X_{02}$, $X_{10}$, $X_{11}$, $X_{12}$, $X_{20}$, $X_{21}$ and $X_{22}$ in the first stage signal transfer matrices $S_{10}$, $S_{11}$ and $S_{12}$ to other arbitrarily selected one of the output signal lines $Y'_{00}$, $Y'_{01}$, $Y'_{02}$, $Y'_{10}$, $Y'_{11}$, $Y'_{12}$ $Y'_{20}$, $Y'_{21}$ and $Y'_{22}$ in the second stage signal transfer matrices $S_{20}$, $S_{21}$ and $S_{22}$. Thus the output signal lines $Y_{00}$, $Y_{01}$ and $Y_{02}$ of the signal transfer matrix $S_{10}$ are connected respectively to the input signal lines $X'_{00}$, $X'_{10}$ and $X'_{20}$ of the second stage signal transfer matrices $S_{20}$, $S_{21}$ and $S_{22}$, and the output signal lines $Y_{10}$, $Y_{11}$ and $Y_{12}$ of the first stage signal transfer matrix $S_{11}$ are connected respectively to the input signal lines $X'_{01}$, $X'_{11}$ and $X'_{21}$ of the second stage signal transfer matrices $S_{20}$, $S_{21}$ and $S_{22}$.

Likewise, the output signal lines $Y_{20}$, $Y_{21}$ and $Y_{22}$ of the first stage signal transfer matrix $S_{12}$ are connected respectively to the input signal lines $X'_{02}$, $X'_{12}$ and $X'_{22}$ of the second stage signal transfer matrices $S_{20}$, $S_{21}$ and $S_{22}$.

Figure 3B:
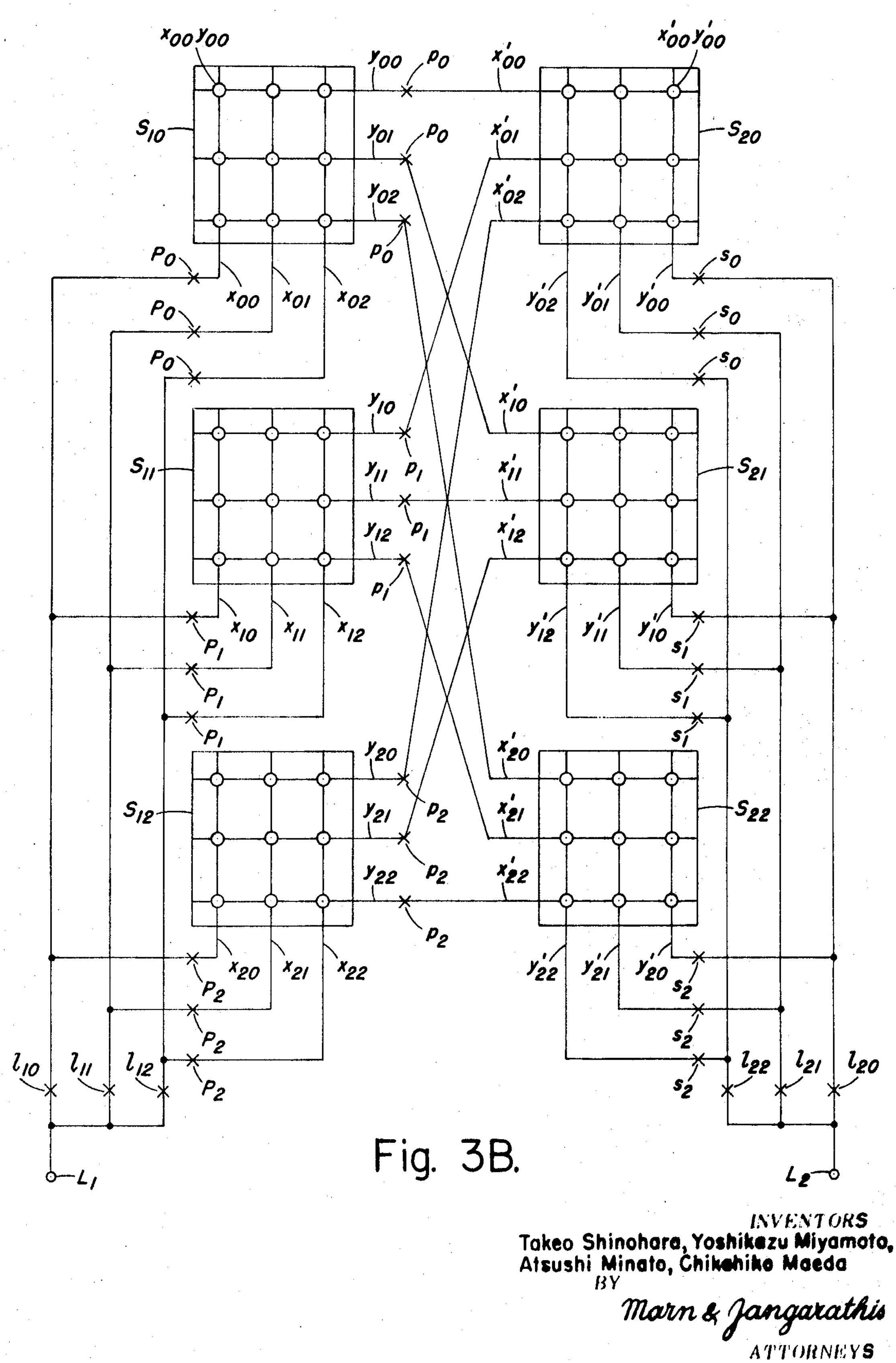

The control line portion corresponding to the above-mentioned signal line portion of the device is shown in FIG. 3B. In the drawing, it will be apparent that the relation between the signal line portion shown in FIG. 3A and the control line portion shown in FIG. 3B is similar to the relation between those shown in FIGS. 2A and 2B.

Furthermore, in the input control lines and the output control lines of the signal transfer matrix $S_{10}$, respective contacts $p_0$ of the multi-contact relay $P_0$ (not shown) are inserted. Also in the input control lines and the output control lines of the signal transfer matrices $S_{11}$ and $S_{12}$, respective contacts $p_1$ and $p_2$ of multi-contact relays $P_1$ and $P_2$ (not shown) are inserted.

In addition, in the output control lines of the signal transfer matrices $S_{20}$, $S_{21}$ and $S_{22}$, contacts $s_0$, $s_1$ and $s_2$ of multi-contact relays $S_0$, $S_1$ and $S_2$ (not shown) are inserted.

With these dispositions of the contacts of the multi-contact relays, the input control lines $x_{00}$, $x_{10}$ and $x_{20}$ are led through the contacts $p_0$, $p_1$ and $p_2$, and also commonly provided contact $l_{10}$ to an input terminal $L_1$ of the control line portion. Similarly, the input control lines $x_{01}$, $x_{11}$ and $x_{21}$ and also $x_{02}$, $x_{12}$ and $x_{22}$ are led through the contacts $p_0$, $p_1$ and $p_2$ and the other set of contact $p_0$, $p_1$ and $p_2$ and also commonly provided contacts $l_{11}$ and $l_{12}$ to the same input terminal $L_1$ of the control line portion.

Furthermore, the output control lines $y'_{00}$, $Y'_{10}$ and $Y'_{20}$ of the second stage signal transfer matrices are led through the contacts $s_0$, $s_1$ and $s_2$ and also a commonly provided contact $l_{20}$ to the output terminal $L_2$ of the control line portion. Also, the output control lines $y'_{01}$, $y'_{11}$, $y'_{21}$ and $y'_{02}$, $y'_{12}$, $y'_{22}$ are led through contacts $s_0$, $s_1$, $s_2$ and another set of contacts $s_0$, $s_1$, $s_2$ and also commonly provided contacts $l_{21}$ and $l_{22}$ to the same terminal $L_2$ of the control line portion.

When one of the multi-contact relays $P_0$, $P_1$ and $P_2$ and another one of the multi-contact relays $S_0$, $S_1$, and $S_2$, for instance, $P_0$ and $S_0$ are energized to close the contacts $p_0$ and $s_0$ and furthermore either one of the commonly provided contacts $l_{10}$, $l_{11}$, $l_{12}$ and also any one of the commonly provided contacts $l_{20}$, $l_{21}$, and $l_{22}$, for instance $l_{10}$ and $l_{20}$, are closed, a driving circuit starting from the input terminal $L_1$ — a commonly provided contact $l_{10}$ — a contact $p_0$ — an input control line $x_{00}$ — a control element ($x_{00}\,y_{00}$) — an output control line $y_{00}$ — a contact $p_0$ — an input control line $x'_{00}$ — a control element ($x'_{00}\,y'_{00}$) — an output control line $y'_{00}$ — a contact $s_0$ — a commonly provided contact $l_{20}$ — to the output terminal $L_2$ is formed. Thus when a control signal is applied between the input terminal $L_1$ and the output terminal $L_2$, the control elements ($x_{00}\,y_{00}$) and ($x'_{00}\,y'_{00}$) are thereby energized, whereby the switching elements ($X_{00}\,Y_{00}$) and ($X'_{00}\,Y'_{00}$) are closed, and a signal path starting from the input signal line $X_{00}$ to the output signal line $Y'_{00}$ is formed.

In the above-described conventional signal transfer device, formation of paths from any one of the input signal lines $X_{00}$, $X_{01}$, $X_{02}$, $X_{10}$, $X_{11}$, $X_{12}$, $X_{20}$, $X_{21}$ and $X_{22}$ to any one of the output signal lines $Y'_{00}$, $Y'_{01}$, $Y'_{02}$, $Y'_{10}$, $Y'_{11}$, $Y'_{12}$, $Y'_{20}$, $Y'_{21}$ and $Y'_{22}$ is made possible with a least number of the switching elements. However, such a signal transfer device employs a signal transfer matrix consisting of a plurality of switching elements 1 as one functional and constructional unit, and includes a plurality of such signal transfer matrices $S_{10}$, $S_{11}$, $S_{12}$, $S_{20}$, $S_{21}$ and $S_{22}$ connected into two series connected stages. Within these matrices, the output signal lines for the first stage of the signal transfer matrices $S_{10}$, $S_{11}$ and $S_{12}$ are connected, for instance by pairs, to the input signal lines for all of the second stage signal transfer matrices $S_{20}$, $S_{21}$ and $S_{22}$. Accordingly, when it is desired to arrange all of the signal transfer matrices in a single horizontal plane, output signal lines from the first stage signal transfer matrices $S_{10}$, $S_{11}$ and $S_{12}$ connected to the input signal lines to the second stage signal transfer matrices $S_{20}$, $S_{21}$ and $S_{22}$ are intersected in the same horizontal plane as in the case of a line connecting the output signal line $Y_{01}$ to the input signal line $X'_{10}$ and another line connecting the output signal line $Y_{10}$ to the input signal line $X'_{01}$. These lines connecting output signal lines from the first stage signal transfer matrices to the input signal lines to the second stage signal transfer matrices are hereinafter called signal link lines.

Providing these mutually intersecting link lines at the production stage of the signal transfer device becomes an extremely complicated work if the number of the link lines is plenty. Furthermore, since these link lines are interconnecting all of the first stage signal transfer matrices to the second stage signal transfer matrices, the link lines cannot be so short, and for this reason the space required for accommodating these link lines becomes considerably large. Particularly when the number of the signal transfer matrices included in one stage is increased, the number of the signal link lines is also increased and the complication of the link lines and the space accommodating these link lines is intensified. Furthermore, the same trouble is also found in the case of those lines connecting the output control lines from the first stage signal transfer matrices to the input control lines to the second stage signal transfer matrices (such lines are hereinafter called control link lines).

A signal transfer device according to the present invention will now be described in detail with reference to FIGS. 4A and B. In the drawing, for the purpose of facilitating the comparison between the device according to the present invention and the conventional signal transfer device, similar or corresponding members to, for instance, the input signal lines and the output signal lines in FIGS. 3A and B are designated by like reference symbols and characters in FIGS. 4A and B.

Figure 4A:
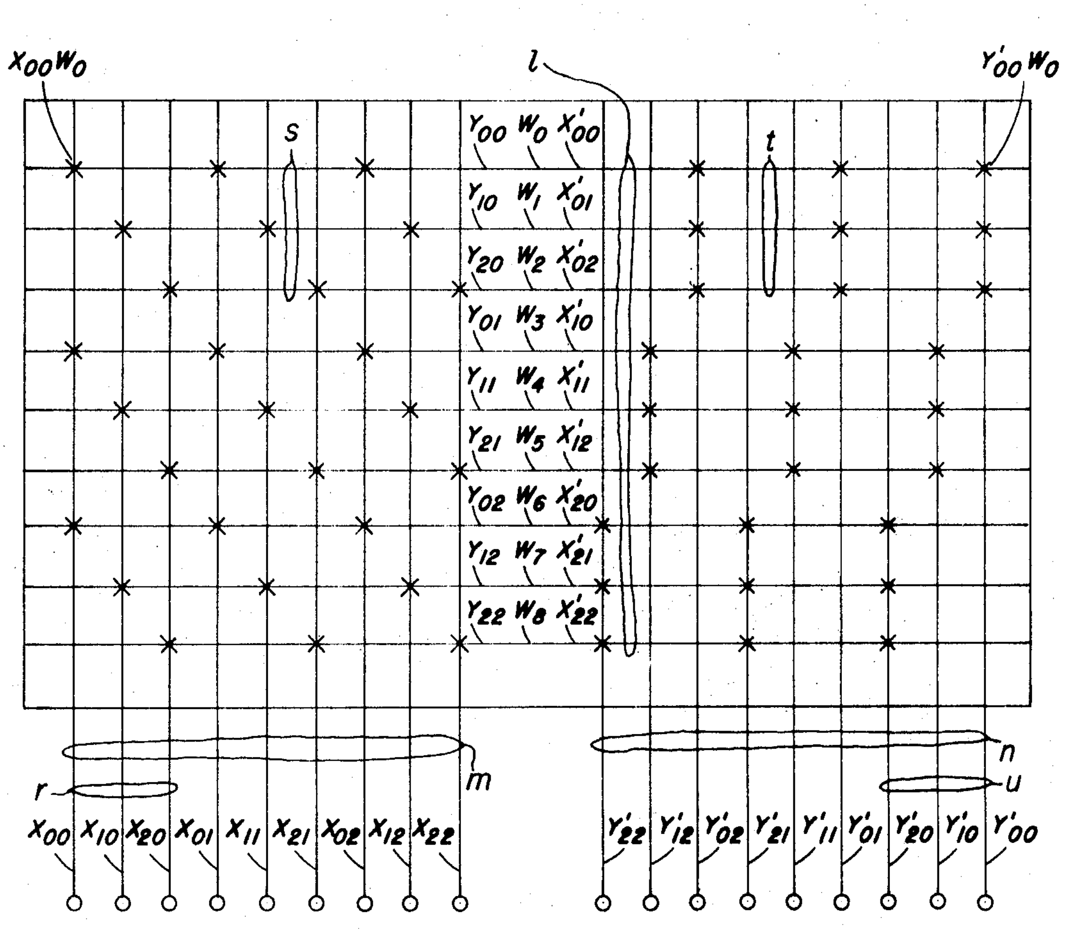
FIGS. 4A and B are schematic line diagrams showing one construction of the signal line portions and the control line portions in a signal transfer device according to the present invention.

The signal line portion of this device is shown in FIG. 4A. A number equal to $l$ (in the shown example, this number is selected to be 9) of signal link lines $W_0$, $W_1$, $W_2$, – $W_8$ are, at one half portions thereof, i.e., input signal link portions $Y_{00}$, $Y_{10}$, $Y_{20}$, $Y_{01}$, $Y_{11}$, $Y_{21}$, $Y_{02}$, $Y_{12}$ and $Y_{22}$, interconnected perpendicularly with a number equal to m (in this example, this number is selected to 9) of input signal lines $X_{00}$, $X_{10}$, $X_{20}$, $X_{01}$, $X_{11}$, $X_{21}$, $X_{02}$, $X_{12}$ and $X_{22}$, and at the other half portions $X'_{00}$, $X'_{01}$, $X'_{02}$, $X'_{10}$, $X'_{11}$, $X'_{12}$, $X'_{20}$, $X'_{21}$ and $X'_{22}$ of the signal link lines, the signal link lines are interconnected perpendicularly with a number equal to $n$ (in this example, this number is selected to 9) of output signal lines $Y'_{00}$, $Y'_{10}$, $Y'_{20}$, $Y'_{01}$, $Y'_{11}$, $Y'_{21}$, $Y'_{02}$, $Y'_{12}$ and $Y'_{22}$. Input signal link portions $Y_{00}$, $Y_{10}$, $Y_{20}$, $Y_{01}$, $Y_{11}$, $Y_{21}$, $Y_{02}$, $Y_{12}$ and $Y_{22}$ and output signal link portions $X'_{00}$, $X'_{01}$, $X'_{02}$, $X'_{10}$, $X'_{11}$, $X'_{12}$, $X'_{20}$, $X'_{21}$ and $X'_{22}$ correspond to identically referenced lines in FIG. 3A. Link portions $Y_{00}$ and $X'_{00}$, $Y_{10}$ and $X'_{01}$, $Y_{20}$ and $X'_{02}$, $Y_{01}$ and $X'_{10}$, $Y_{11}$ and $X'_{11}$, $Y_{21}$ and $X'_{12}$, $Y_{02}$ and $X'_{20}$, $Y_{12}$ and $X'_{21}$ and $Y_{22}$ and $X'_{22}$ are connected by the parallel links $W_0 - W_8$, respectively, which replace the cross-over junctors shown in FIG. 3A. Furthermore, at the input signal line side, the $m$ input signal lines are divided into a plurality of groups each including $r$ input signal lines (in this example, $r$ is selected to be 3) such as $X_{00}$, $X_{10}$, $X_{20}$; $X_{01}$, $X_{11}$, $X_{21}$; and $X_{02}$, $X_{12}$, $X_{22}$; (in this example, the number of groups is $m/r = 9/3 = 3$). Likewise, the signal link lines are divided into groups each including $s$ signal link lines (in this example, $s$ is selected to be 3) such as $W_0$, $W_3$, $W_6$; $W_1$, $W_4$, $W_7$; $W_2$, $W_5$, $W_8$ (in this example, the number of groups is $l/s = 3$), and each input signal line included in each group is corresponded to a different group (including s signal link lines) of the signal link lines. At each of the intersecting points between the thus corresponding input signal lines and signal link lines, a switching element 1 which can connect the thus intersecting lines is provided. To be more particular, within a group consisting of $X_{00}$, $X_{10}$ and $X_{20}$, an input signal line $X_{00}$ corresponds to a group of the signal link lines $W_0$, $W_3$ and $W_6$, and a switching element 1 is provided at each intersecting point of the input signal line $X_{00}$ and the corresponding links $W_0$, $W_3$ and $W_6$. Likewise, other input signal lines $X_{10}$ and $X_{20}$ correspond respectively to signal link lines $W_1$, $W_4$, $W_7$, and $W_2$, $W_5$, $W_8$, respectively, and between these corresponding lines, switching elements 1 are provided. Similarly, input signal lines $X_{01}$, $X_{11}$, and $X_{21}$ are respectively provided with switching elements 1 at the intersecting points with the signal link lines $W_0$, $W_3$, $W_6$; $W_1$, $W_4$, $W_7$; $W_2$, $W_5$, $W_8$, and the input signal lines $X_{02}$, $X_{12}$, $X_{22}$ are provided with switching elements 1 respectively at the intersecting points with the signal link lines $W_0$, $W_3$, $W_6$; $W_1$, $W_4$, $W_7$; $W_2$, $W_5$, $W_8$.

The signal link lines of a number $l$ are divided in groups at the output signal line side, each group including $t$ signal link lines (in this example, $t$ equals to 3) such as $W_0$, $W_1$, $W_2$; $W_3$, $W_4$, $W_5$; $W_6$, $W_7$, $W_8$; and also $n$ output signal lines are divided into a plurality of groups each including $u$ output signal lines such as $Y'_{00}$, $Y'_{10}$, $Y'_{20}$; $Y'_{01}$, $Y'_{11}$, $Y'_{21}$; and $Y'_{02}$, $Y'_{12}$, $Y'_{22}$.

Each output signal line within one group of the output signal lines corresponds to a different group including $t$ signal link lines, and at the intersecting points between the signal link lines and thus corresponding output signal lines, switching elements capable to bridge-connect these two kinds of lines are provided respectively. To be more particular, an output signal line $Y'_{00}$ within a group including the output signal lines $Y'_{00}$, $Y'_{10}$ and $Y'_{20}$ corresponds to signal link lines $W_0$, $W_1$ and $W_2$, and between the output signal line and the corresponding signal link lines, switching elements 1 is provided. Likewise, other output signal lines $Y'_{10}$ and $Y'_{20}$ within the group respectively correspond to signal link lines $W_3$, $W_4$, $W_5$; and $W_6$, $W_7$, $W_8$, and at the intersecting points between the two output signal lines $Y'_{10}$ and $Y'_{20}$ and the corresponding signal link lines $W_3$, $W_4$, $W_5$; and $W_6$, $W_7$, $W_8$, there are provided switching elements 1 respectively.

Similarly, the output signal lines $Y'_{01}$, $Y'_{11}$, $Y'_{21}$ are provided with switching elements at the intersecting points with the signal link lines $W_0$, $W_1$, $W_2$; $W_3$, $W_4$, $W_5$; and $W_6$, $W_7$, $W_8$; and the output signal lines $Y'_{01}$, $Y'_{12}$, $Y'_{22}$ are provided with switching elements at the intersecting points with the signal link lines $W_0$, $W_1$, $W_2$; $W_3$, $W_4$, $W_5$; and $W_6$, $W_7$, $W_8$; respectively.

Figure 4B:
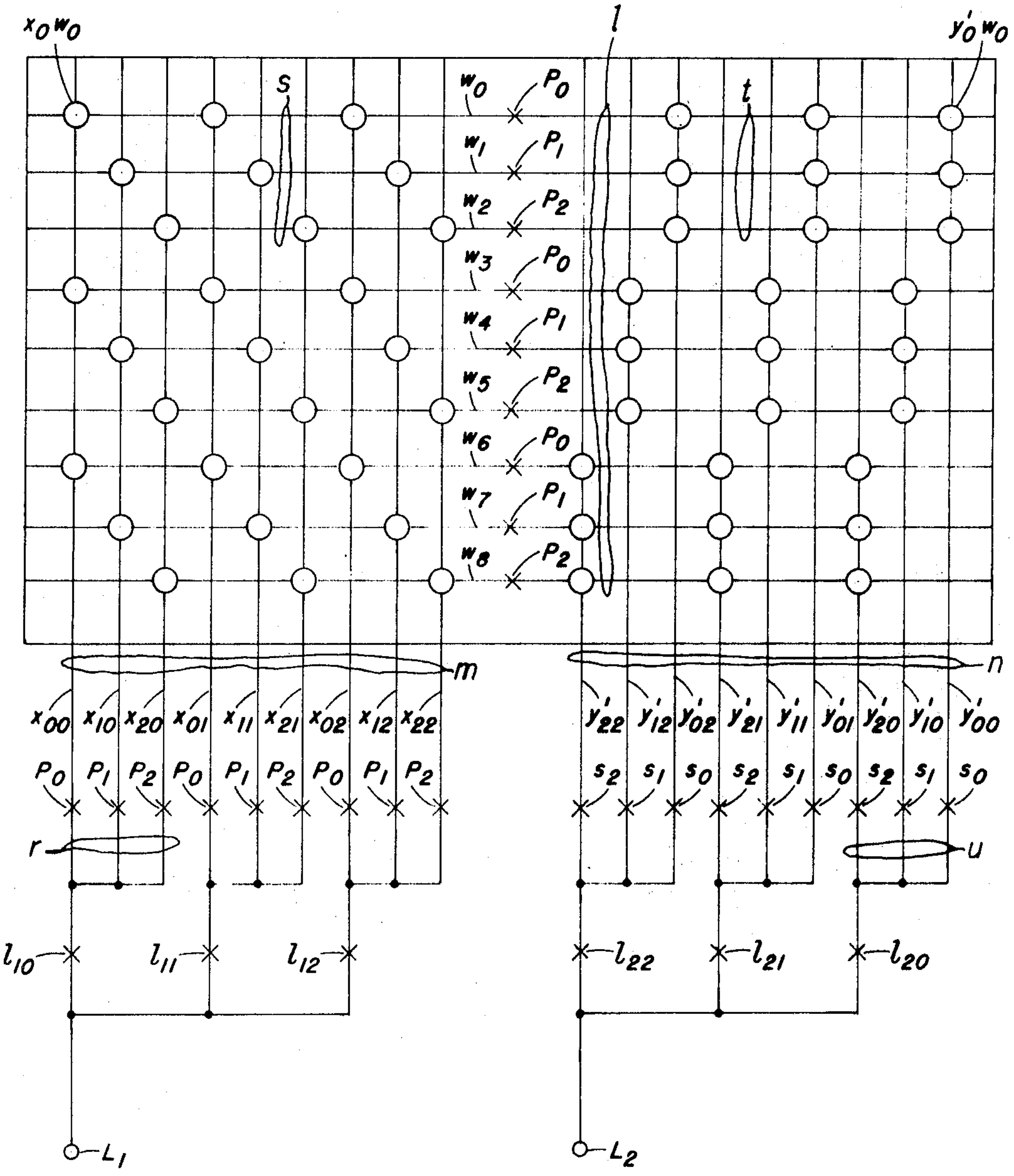

The control line portion of the signal transfer device according to the present invention is illustrated in FIG. 4B. In this example, the input control lines, output control lines, and the control link lines correspond respectively to the input signal lines, output signal lines and the signal link lines, and the three kinds of lines included in the control line portion are connected in similar manner to the corresponding lines in the signal line portion of the device.

More specifically, a number equal to $l$ of the control link lines $W_0$, $W_1$, $W_2$, $- W_8$ are, at one half portion thereof, intersected with $m$ input control lines, and the $l$ control link lines are divided into a plurality of groups each including s control link lines such as $W_0$, $W_3$, $W_6$; $W_1$, $W_4$, $W_7$; and $W_2$, $W_5$, $W_8$. Likewise, $m$ input control lines are divided into a plurality of groups each including $r$ input control lines such as $x_{00}$, $x_{10}$, $x_{20}$; $x_{01}$, $x_{11}$, $x_{21}$; and $x_{02}$; $x_{12}$, $x_{22}$.

Control elements 2 are connected at the intersecting points between an input control line $x_{00}$ within one group of the input control lines $x_{00}$, $x_{10}$, and $x_{20}$ and a group of the control link lines $w_0$, $w_3$ and $w_6$, and other input control lines $x_{10}$ and $x_{20}$ are provided with control elements 2 at their intersecting points with other groups of the control link lines $w_1$, $w_4$, $w_7$, and $w_2$, $w_5$, $w_8$, respectively. Likewise, in the groups of input control lines $x_{01}$, $x_{11}$, $x_{21}$, and $x_{02}$, $x_{12}$, $x_{22}$, control elements 2 are provided at the intersecting points between each input control line and a different group of the control link lines.

Furthermore, in the other half portion of the control link lines, $n$ output control lines are intersected, and the control link lines are divided into groups each including $t$ control link lines such as $w_0$, $w_1$, $w_2$; $w_3$, $w_4$, $w_5$; and $w_6$, $w_7$, $w_8$, and the output control lines are divided into groups each including $u$ output control lines such as $y'_{00}$, $y'_{10}$, $y'_{20}$; $y'_{01}$, $y'_{11}$, $y'_{21}$; and $y'_{02}$, $y'_{12}$, $y'_{22}$. At the intersecting points between the control link lines $w_0$, $w_1$, $w_2$ and an output control line $y'_{00}$ within a group of the output control lines $y'_{00}$, $y'_{10}$ and $y'_{20}$, control elements 2 are provided. Similarly, at intersecting points between other output control lines $y'_{10}$ and $y'_{20}$ and the control link lines $w_3$, $w_4$, $w_5$ and $w_6$, $w_7$, $w_8$, control elements 2 are provided. In the same manner, within the output control lines $y'_{01}$, $y'_{11}$, $y'_{21}$, and $y'_{02}$, $y'_{12}$, $y'_{22}$, each output control line is provided with control elements at intersection points between the points of the control link lines $w_0$, $w_1$, $w_2$; $w_3$, $w_4$, $w_5$; $w_4$, $w_7$, $w_8$.

Furthermore, the input control lines are connected through respectively provided switches to one side of $m/r$ commonly provided switches one for each group of the input control lines including $r$ lines thereof, and the other side of the commonly provided switches of a number equal to $m/r$ are connected to one terminal of a control signal line. More specifically, in this example, one group $x_{00}$, $x_{10}$ and $x_{20}$ of the input control lines each group including $r$ input control lines are connected to one common switch $l_{10}$ within $9/3 = 3$ commonly provided switches $l_{10}$, $l_{11}$, and $l_{12}$, through respectively provided switches $p_0$, $p_1$ and $p_2$ on the control lines. Similarly, other groups of the input control lines $x_{01}$, $x_{11}$, $x_{21}$; $x_{02}$, $x_{12}$, $x_{22}$ are connected through the respectively provided switches $p_0$, $p_1$, $p_2$ and $p_0$, $p_1$, $p_2$ to one side of the commonly provided switches $l_{11}$ and $l_{12}$, and the other side of the thus provided common switches $l_{10}$, $l_{11}$ and $l_{12}$ are connected to one terminal of the input terminal $L_1$ of the input control lines.

In a similar manner, the output control lines are connected, for every group including u control lines, through the respectively provided switches, to one side of $n/u$ commonly provided switches, and the other side of the $n/u$ commonly provided switches are connected to one terminal for the output control lines. In this example, one group $y'_{00}$, $y'_{10}$, $y'_{20}$ including $u$ output control lines (herein, $u$ is supposed to be 3) are connected through the respectively provided switches $s_0$, $s_1$, $s_2$ to one side of a switch $l_{20}$ within $9/3 = 3$ commonly provided switches $l_{20}$, $l_{21}$, $l_{22}$, and similarly, other groups $y'_{01}$, $y'_{11}$, $y'_{21}$ and $y'_{02}$, $y'_{12}$, $y'_{22}$ of the output control lines are connected through the respectively provided switches $s_0$, $s_1$, $s_2$ and $s_0$, $s_1$, $s_2$ to one side of the commonly provided switches $l_{21}$ and $l_{22}$. The other side of the commonly provided switches $l_{20}$, $l_{21}$ and $l_{22}$ are connected to one terminal $L_2$ for the output control lines.

Furthermore, at an intermediate portion between the input control lines and the output control lines, each of the control link lines $w_0$, $w_1$, $w_2$, $w_3$, $w_4$, $w_5$, $w_6$, $w_7$ and $w_8$ is provided with one separately provided switch $p_0$, $p_1$, $p_2$, $p_0$, $p_1$, $p_2$, $p_0$, $p_1$, $p_2$. It should be noted that six sets of $p_0$, $p_1$ and $p_2$ switches are provided in the above-described arrangement, and since each group of the switches having the same suffix are operated simultaneously, these may be realized through the use of the contacts of multi-contact relays $P_0$, $P_1$ and $P_2$. Similarly, there are three sets of the separately provided switches on the output control lines, and these may also utilize the contacts of multi-contact relays $S_0$, $S_1$ and $S_2$.

When it is desired to form a path starting from an input signal line $X_{00}$, to an output signal line $Y'_{00}$, the contacts $p_0$ and $s_0$ of the multi-contact relays $P_0$ and $S_0$ and also the commonly provided switches $l_{10}$ and $l_{20}$ are closed. If these contacts and switches are closed, a driving path starting from the input terminal $L_1$ — switch $l_{10}$ — contact $p_0$ — input control line $x_{00}$ — a control element ($x_{00}$ $w_0$) — control link line $w_0$ — another control element ($y'_{00}$ $w_0$) — output control line $y'_{00}$ — contact $s_0$ — switch $l_{20}$ — output terminal $L_2$ is formed. Thus, if a control signal is applied across the input terminal $L_1$ and the output terminal $L_2$, the control elements ($x_{00}$ $w_0$) and ($y'_{00}$ $w_0$) are driven, closing the switching elements ($X_{00}$ $W_0$) and ($Y'_{00}$ $W_0$), and a signal path starting from an input signal line $X_{00}$ — signal link line $W_0$ — to output signal line $Y'_{00}$ is thereby formed.

In a similar manner, when every one of the contacts $p_0$, $p_1$, $p_2$; $s_0$, $s_1$, $s_2$; and of switches $l_{10}$, $l_{11}$, $l_{12}$, $l_{20}$, $l_{21}$, $l_{22}$, in the control line portion of the device are closed selectively, a control element 2 corresponding to the switching element 1 located at an intersecting point in the signal path to be formed is energized, and a signal path starting from any one of the input signal lines $X_{00}$, $X_{10}$, $X_{20}$, $X_{01}$, $X_{11}$, $X_{21}$, $X_{02}$, $X_{12}$ and $X_{22}$ to any one of the output signal lines $Y'_{00}$, $Y'_{10}$, $Y'_{20}$, $Y'_{01}$, $Y'_{11}$, $Y'_{21}$, $Y'_{02}$, $Y'_{12}$ and $Y'_{22}$ can be formed.

It should be noted that the construction of the signal transfer device shown in FIG. 4A is in a relation wherein the signal lines in the conventional signal transfer device shown in FIG. 3A are suitably rearranged. More specifically, the arrangement in FIG. 3A can be rearranged to the construction shown in FIG. 4A when an output signal line $Y_{00}$ in a signal transfer matrix $S_{10}$ at the first stage in the conventional device is left as it was, an output signal line $Y_{01}$ is replaced by an output signal line $Y_{10}$ from the signal transfer matrix $S_{11}$, an output signal line $Y_{02}$ is replaced by an output signal line $Y_{20}$ from the signal transfer matrix $S_{12}$, link lines connecting signal lines $Y_{10}$ and $X'_{01}$, and $Y_{20}$ and $X'_{02}$ respectively are extended straight, likewise an output signal line $Y_{10}$ from the signal transfer matrix $S_{11}$ is replaced by an output signal line $Y_{01}$, another output signal line $Y_{12}$ thereof is replaced by an output signal line $Y_{20}$, in the signal transfer matrix $S_{12}$ an output signal line $Y_{20}$ and another output signal line $Y_{21}$ are replaced by output signal lines $Y_{02}$ and $Y_{22}$, and when the signal link lines are extended straight. It should be noted that those corresponding to output signal lines from the signal transfer matrices at the first stage in FIG. 3A, and located at the input side of the signal link lines shown in FIG. 4A, are designated by like reference characters and numerals, and likewise, those located at the output side of the signal link lines in FIG. 4A and corresponding to the input signal lines to signal transfer matrices at the second stage in FIG. 3A are designated by like reference characters and numerals.

The above-described relation can also be applied to the control line portion of the signal transfer device. Accordingly, the signal transfer device shown in FIGS. 4A and 4B has the same number of switching elements as in the case shown in FIG. 3 and can operate in the similar manner. That is, in the signal transfer device according to the present invention, the required number of the switching elements 1 can be maintained to be minimum, and parts employed in the conventional device may also be employed in the device according to the present invention. Furthermore, the $l$ signal link lines and the control link lines in the device according to the invention do not run across in the same plane but run in parallel in the plane. For this reason, the arrangement of lead wires in the production stage is simplified and the mechanization of the wiring process is also made possible. Furthermore, the wiring work may also be achieved by way of the print-circuit technique.

As described in the forward part of the description, the link lines interconnecting the first stage matrices and the second stage matrices in the conventional device shown in FIG. 3 have run across one over the other, and the length thereof also have been comparatively long, whereby there is a necessity of providing a comparatively large space between the first and the second stages of the matrices.

In the signal transfer device according to the present invention, the input signal line portion can be brought as near as desired to the output signal line portion of the device, and the space utility factor can be improved to that extent. Furthermore, since the length of the signal lines and control lines may be shortened, the transmission loss in the signal lines and creation of noises due to the control signals applied to the control lines are allowed to be minimized and the electrical characteristics of the signal transfer device can be substantially improved.

As is apparent from the construction illustrated in FIG. 4A, for instance an input signal line $X_{00}$ intersects with three link lines $W_0$, $W_3$ and $W_6$ at a predetermined interval, and switching elements are provided at the above-mentioned intersecting points. From this fact, it will be apparent that the whole construction of the device can be obtained if this single input signal line, a plurality of link lines spaced apart by a predetermined interval, and switching elements provided at the intersecting points between the above-mentioned input signal line and the plurality of link lines, are all formed into one unit, one such unit for the input signal line $X_{10}$ being arranged in parallel with the single unit for the input signal line $X_{00}$ and in a position displaced by a predetermined distance in the same plane or in the different plane, and if this procedure is repeated for other input signal lines and also for the output signal lines successively.

By this way the number of the input signal lines and the number of the output signal lines can be freely changed by increasing or decreasing the number of the units, whereby the device of different size and of different applications can be constructed by combining the units of the same construction. For this reason, there is no necessity of preparing various kinds of parts in the production of the signal transfer device according to the present invention, and hence its economical and productive superiority over the conventional construction is apparent.

Although in the construction shown in FIGS. 4A and B the input control lines and the output control lines are respectively divided into a plurality of groups each including a certain number of the component lines, and all of the component lines included in a group are connected to a commonly provided switch, it is also possible that these component input or output control lines are collectively unified into a single control line.

Figure 5:
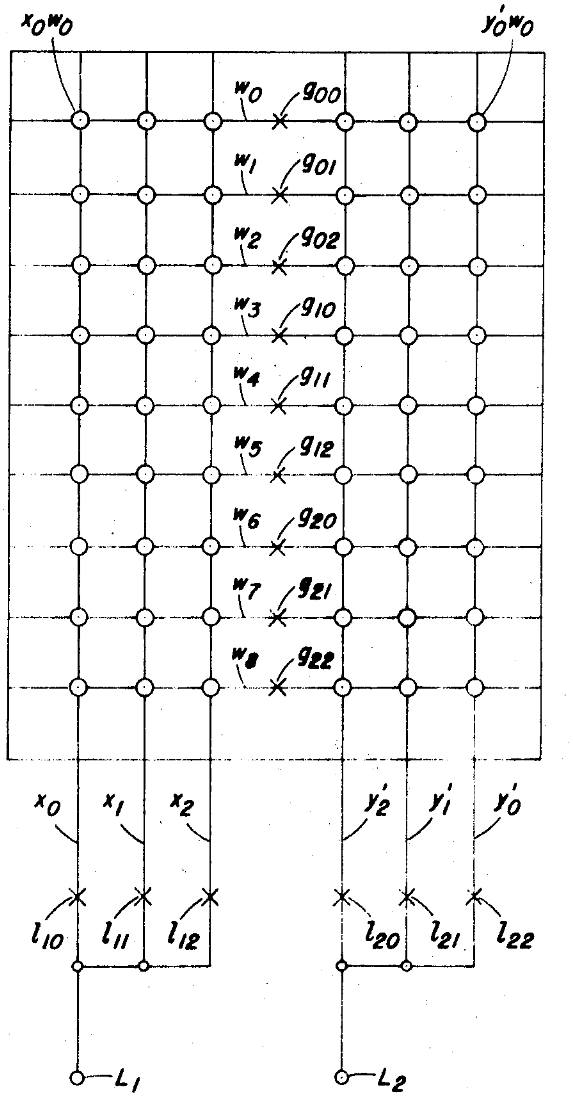
FIG. 5 is a schematic line diagram showing another construction of the signal line portion and the control line portion in the signal transfer device which constitutes another embodiment of the present invention.

FIG. 5 illustrates such an example of the signal transfer device constituting another embodiment of the present invention In this embodiment, at one-half portion of the control link lines $w_0$, $w_1$, $w_2 - w_8$, one input control line $x_0$ corresponding to the input signal lines $X_{00}$, $X_{10}$, $X_{20}$ and likewise other input control lines $x_1$ and $x_2$ corresponding to input signal lines $X_{01}$, $X_{11}$, $X_{21}$ and $X_{02}$, $X_{12}$, $X_{22}$, respectively, are provided in parallel with each other. Similarly, in the other half portion of the control link lines, output control lines $y'_0$, $y'_1$, $y'_2$ are provided to correspond to the output signal lines $Y'_{00}$, $Y'_{10}$, $Y'_{20}$; $Y'_{01}$, $Y'_{11}$, $Y'_{21}$; and $Y'_{02}$, $Y'_{12}$, $Y'_{22}$, respectively. The input control lines $x_0$, $x_1$ and $x_2$ are connected respectively through switches $l_{10}$, $l_{11}$, and $l_{12}$ to an input terminal $L_1$, and the output control lines $y'_0$, $y'_1$ and $y'_2$ are connected respectively through switches $l_{20}$, $l_{21}$ and $l_{22}$ to the output terminal $L_2$. In this case, the control elements 2 are provided at intersecting points between the control link lines $w_0$, $w_1$, $w_2$,–, $w_8$ and both of the input and output control lines $x_0$, $x_1$, $x_2$ and $y'_0$, $y'_1$, $y'_2$. Furthermore, the switching elements corresponding to the control elements are assumed to be reset only when a control signal is applied to the specific one of the control lines connected to the control elements, and even if a control signal is applied to the other control line connected to the control elements no resetting of the switching elements corresponding to the control element will occur.

In this embodiment, it is assumed that the switching elements will be reset only when a control signal is applied to the control link lines. Furthermore, switches $g_{00}$, $g_{01}$, $g_{02}$, $g_{10}$, $g_{11}$, $g_{12}$, $g_{20}$, $g_{21}$, $g_{22}$, inserted between the input control line side and the output control line side of the control link lines are assumed to be operated individually differing from the case shown in FIG. 4B.

Thus, when it is desired to form a signal path between, for instance, input signal line $X_{00}$ and output signal line $Y'_{00}$ in the signal line portion of the device shown in FIG. 4A, two switches $l_{10}$ and $l_{22}$ and a link selecting contact $g_{00}$ in FIG. 5 are closed. In that case, a driving circuit starting from input terminal $L_1$ — switch $l_{10}$ — input control line $x_0$ — control element ($x_0$ $w_0$) — control element ($y'$ $w$ ) — output control line $y'$ — switch $l_{22}$ — output terminal $L_2$ is formed, whereby switching elements ($X_{00}$ $W_0$) and ($Y'_{00}$ $W_0$) corresponding respectively to the control elements ($x_0$ $w_0$) and ($y'_0$ $w_0$) are closed, thus forming a signal path through the signal lines $X_{00}$ and $Y'_{00}$. Although the switching elements along the signal link line $W_0$ are all in the opened state except the switching elements ($X_{00}$ $W_0$) in ($Y'_{00}$ W ) due to the control signal applied through the above-mentioned signal path, switching elements corresponding to the control elements positioned along the input control line $x_0$ and the output control line $y_0$ are not opened by this control signal. As a result, when it is assumed that a signal path starting from the input signal line $X_{10}$ to the output signal line $Y'_{10}$ is used, the control signal path for controlling the above-mentioned signal path and the control signal path (or driving path) for controlling the last-mentioned signal path starting from $X_{10}$ to the output signal line $Y'_{10}$ commonly employ the input control line $x_0$ and the output control line $y_0$ only, and while the control link line employed for the before mentioned control signal line is $w_0$, the control link line employed for the last-mentioned control signal line is $w_4$. For this reason, there is no possibility of the signal path between the input signal line $X_{00}$ and the output signal line $Y_{00}$ causing to open the signal path between the input signal line $X_{10}$ and the output signal line $Y'_{10}$.

From the above description, it will be apparent that the control line portion shown in FIG. 5 can operate in the same manner as in the control line portion shown in FIG. 4B. Furthermore, in the control line portion shown in FIG. 5, the control elements to control switching elements can be arranged more closely, the input control lines and the output control lines can be disposed in the same plane, the construction of the control lines portion can be more simplified than that shown in FIG. 4B, whereby the production of the control line portion becomes much easier. Furthermore, the required number of the contacts for the selection of the control lines can be minimized and the reliability of the signal transfer device employing the control line portion is remarkably improved.

The control line portion of the signal transfer device according to the present invention is not necessarily limited to that indicated in FIG. 4A or in FIG. 5, but any other construction allowing to control the switching elements selectively may also be employed for accomplishing the function. Furthermore, in the above-described construction, although the switching elements of magnetically self-holding type are employed, the switching elements may also be of an electric current holding type, a mechanically holding type, or an electronic type element.

Likewise, the contact and switches employed in the control line portion for selecting the control path are not necessarily limited to the above-described relay construction, and it will be apparent that the electronic contacts or switching elements may also be advantageously employed instead of the above-described relay construction.

In the above-described embodiment, there are provided switching elements at all intersecting points between both lines. But is will be easily appreciated that switching elements may not be provided at all of the intersecting points but may be provided at predetermined some of the intersecting points.

What is claimed is:

1. A signal switching device, comprising:

an $l$ number of signal links spaced in parallel in one plane and divided into a plurality of groups of input portions, each group including an $s$ number of said portions; said links further divided into a plurality of groups of output portions, each latter group including a $t$ number of said latter portions; said plurality of input portion groups $x\ s =$ said plurality of $o$-put portion groups $x\ t=l$ ;

an $m$ number of input signal lines spaced in parallel in one direction to cross said input link portions at right angles, each input line crossing each input link portion; said input lines divided into a plurality of groups, each including an $r$ number of said lines; said plurality of input line groups $x\ r = m = l$;

an $n$ number of output signal lines spaced in parallel in said one direction to cross said output link portions at right angles, each output line crossing each output link portion; said output lines divided into a plurality of groups, each including a $u$ number of said output lines; said plurality of output line groups $x\ u = n = l$; said links, input lines and output lines maintaining a relation of $r \times s = u \times t = l$;

a plurality of normally open switching elements connected to said input link portions and input lines at crossings of each of said input link portions in said respective groups thereof and corresponding input lines in said respective groups thereof; said elements also connected to said output link portions and said output lines at crossings of each of said groups of said output link portions and corresponding output lines in said respective groups thereof; and a plurality of control elements coupled to said switching elements at said crossings of said input lines and input link portions and of said output link portion groups and output lines;

whereby the application of a control signal to one control element coupled to one switching element connected to one of said input lines and a corresponding input link portion and to a second control element coupled to a second switching element connected to one of said output lines and a corresponding output link portion group closes said one and second switching elements to establish a signal path including said one input signal line, one input link portion, closed one and second switching elements, one output link portion contained in said last-mentioned output link portion group and said one output signal line.

2. The signal switching device according to claim 1 which includes:

an $l$ number of control links spaced in parallel in a second plane parallel with said one plane and divided into a plurality of groups of input portions, each latter group including an $s$ number of said latter portions, and into a plurality of groups of output portions, each latter group including a $t$ number of said latter portions; said plurality of input control link portion groups $x\ s =$ said plurality of output control link portion groups $x\ t = l$;

an $m$ number of input control lines spaced in parallel in said one direction to cross said input control link portions at right angles, each input control line crossing each input control link portion; said input control lines divided into a plurality of groups, each including an $r$ number of input control lines; said plurality of input control line groups $x\ r = m = l$;

an $n$ number of output control lines spaced in parallel in said one direction to cross said output control link portions at right angles; each output control line crossing each output control link portion; said output control lines divided into a plurality of groups, each including a $u$ number of said output control lines; said plurality of output control line groups $x\ u = n = l$; said control links, input control lines and output control lines maintaining a relation of $r \times s = u \times t = l$;

a control signal input terminal;

an $m/r$ number of normally open input control signal switches connected to said input terminal; each of said last-mentioned switches also connected to said input control lines in one group thereof;

a control signal output terminal;

an $n/u$ number of normally open output control signal switches connected to said output terminal; each of said last-mentioned switches also connected to said output control lines in one group thereof; and a plurality of additional normally open switches, one connected in each of said input control lines in proximity of one of said $m/r$ switches, in each of said control links between said respective input and output portions thereof, and in each of said output control lines in proximity of one of said $n/u$ switches;

whereby the application of said control signal to said input and output terminals closes one of said $m/r$ switches and one of said additional switches which latter one switch is connected in one of said input control lines which latter one control line is connected to said control element coupled to said closed one switching element which is connected to said one input signal line; said control signal also closes one of said additional switches connecting said one input link portion and said one output link portion; said control signal also closes one of said $n/u$ switches and another one of said additional switches which latter one switch is connected in one of said output control lines which latter one control line is connected to said control element coupled to said closed second switching element which is connected to said one output signal line to establish said signal path including said one input signal line and one output signal line.

3. A signal switching device, comprising:

an $m$ number of input signal lines spaced in parallel in one direction and formed in a plurality of groups, each containing an $r$ number of said lines; said plurality of groups multiplied by $r = m$;

an $n$ number of output signal lines spaced in parallel in said one direction and separated from said input lines to form a plurality of groups, each consisting of a $u$ number of said output lines; said plurality of groups multiplied by $u = n$;

an $l$ number of signal links spaced in parallel and disposed between said input and output lines to cross said input and output lines at right angles thereto; said links divided into a plurality of groups of input portions, each latter group containing an $s$ number of said portions; said links further divided into a plurality of groups of output portions, each latter group having a $t$ number of said latter portions; said plurality of input groups multiplied by $r =$ said plurality of output groups multiplied by $u = l$; and normally open switching means connected to said input lines and input link portions at crossings of corresponding input lines in said respective groups thereof and of corresponding input link portions in said respective groups thereof; said means also connected to said output lines and output link portions at crossings of corresponding output lines in said respective groups thereof and of corresponding groups of said output link portions;

whereby an application of a control signal to one of said switching means connected to one of said input lines and a corresponding one input link portion and to a second of said switching means connected to one of said output lines and a corresponding one output link portion group closes said one switching means at a crossing of said one input line and said one input link portion and also closes said second switching means at a crossing of said one output line and said one output link portion group to establish a signal path including said one input signal line, closed one switching means, one input link portion, closed second switching means, one output link portion contained in said one output link portion group, and one output signal line.

4. The switching device according to claim 3 in which said $m$, $n$ and $l$ numbers are identical.

5. The switching device according to claim 3 in which said $r$, $s$, $t$ and $u$ numbers are identical.

6. The switching device according to claim 3 in which $r \times s = u \times t = l$.

* * * * *